United States Patent
Beck

(10) Patent No.: US 6,704,393 B2
(45) Date of Patent: *Mar. 9, 2004

(54) CONDITIONER UNIT FOR PAIR GAIN TEST CONTROLLER

(75) Inventor: John Beck, Wake Forest, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/133,219

(22) Filed: Apr. 26, 2002

(65) Prior Publication Data

US 2003/0021392 A1 Jan. 30, 2003

Related U.S. Application Data

(63) Continuation of application No. 09/165,464, filed on Oct. 2, 1998, now Pat. No. 6,404,855.

(51) Int. Cl.[7] ............... H04M 1/24; H04M 3/08; H04M 3/22
(52) U.S. Cl. ................... 379/27.01
(58) Field of Search ............... 379/1.01, 2, 9, 379/9.06, 14.01, 17, 21, 22, 22.01, 22.03, 22.04, 22.05, 24, 27.01, 27.06, 29.01, 29.05

(56) References Cited

U.S. PATENT DOCUMENTS

| | | | |
|---|---|---|---|
| 4,258,231 A | | 3/1981 | Lenz et al. |
| 4,270,030 A | * | 5/1981 | Brolin et al. ............ 379/22.05 |
| 4,641,299 A | * | 2/1987 | Kemper et al. ............ 370/250 |
| 4,653,043 A | | 3/1987 | Brady et al. |
| 5,103,473 A | * | 4/1992 | Sullins et al. ............ 379/29.01 |
| 5,115,462 A | | 5/1992 | Kennedy et al. |
| 5,187,733 A | | 2/1993 | Beffel et al. |
| 5,195,124 A | | 3/1993 | Ishioka |
| 5,598,455 A | | 1/1997 | Bliven et al. |
| 5,615,225 A | | 3/1997 | Foster et al. |
| 5,652,712 A | | 7/1997 | Szczebak, Jr. et al. |
| 5,677,941 A | | 10/1997 | Rice |
| 5,680,391 A | * | 10/1997 | Barron et al. ............ 370/110.1 |
| 5,832,058 A | | 11/1998 | Walance et al. |
| 5,920,609 A | | 7/1999 | Toumani et al. |
| 5,946,374 A | | 8/1999 | Bower |
| 6,404,855 B2 | * | 6/2002 | Beck ............ 379/27.01 |

OTHER PUBLICATIONS

Inventor Affidavit by John Beck filed on Mar. 29, 2001 in U.S. Ser. No. 09/165,464, filed on Oct. 2, 1998, now issued as U.S. Pat. No. 6, 404,855, 2 pages.

* cited by examiner

Primary Examiner—Duc Nguyen
Assistant Examiner—Quoc Duc Tran
(74) Attorney, Agent, or Firm—Fogg and Associates, LLC; Jon M. Powers

(57) ABSTRACT

A conditioner unit is wired in parallel with a pair gain test controller used to test a digital loop carrier telephone network. The conditioner unit senses a signal intended to request test results from the pair gain test controller and provides a response signal which indicates that the pair gain test controller performed a successful test, even though the pair gain test controller was not activated. This allows testing of the network without use of a bypass pair or the need to interface the digital loop carrier network with the pair gain test controller.

4 Claims, 5 Drawing Sheets

CONDITIONER UNIT FOR PAIR GAIN TEST CONTROLLER

This application is a continuation of Ser. No. 09/165,464 filed Oct. 2, 1998 U.S. Pat. No. 6,404,855.

BACKGROUND OF THE INVENTION

In an analog telephone network, a pair of wires—the tip and ring lines—are used to connect a subscriber's telephone to the central office (CO). To test the network, sometimes an automated test system is used; a mechanized loop tester (MLT) is an example of such a test system. The MLT is connected to a central office switch and is connected through the switch to the line pair under test. On plain old telephone service ("POTS") line pairs, the MLT performs a series of automated tests, which include measurements for shorts, opens, resistive faults and foreign voltages, etc.

With the introduction of digital loop carrier (DLC) systems, multiple phone channels are multiplexed onto a line pair. This practice is known as adding pair gain. A DLC system, based on HDSL (high-bit-rate digital subscriber line) technology, is shown in FIG. 1. A central office 10 includes a CO switch 12 and a central office line unit (COLU) 14. In the example of FIG. 1, four line pairs from the CO switch are input to the COLU 14.

The COLU is coupled to a remote line unit (RLU) 16 via a single pair of copper wires, labeled HDSL pair. The HDSL pair is an ordinary pair of copper wires. However, high speed data rates (e.g., 784 Kbps in each direction) are achievable by HDSL technology. HDSL utilizes digital signal processing techniques to create a mathematical model of the HDSL copper pair and compensate for the distortion imparted on the signal by the copper line pair. At the RLU 16, the digital signal is demultiplexed and converted into analog signals corresponding to those which originated at the CO switch 12. The analog signals are supplied to the subscribers' telephones. In this example, one pair of copper wires (the HDSL pair) is used to provide a high speed transmission path for four separate telephone channels.

Testing of the FIG. 1 system is complicated by the fact that there is not a direct analog connection between the CO switch and a subscriber's line. To test the DLC channel, a pair gain test controller (PGTC) is used. A MLT is still used to test the wire pairs beyond the DLC devices.

The mechanized loop tester (MLT-2) 18 is coupled via the trunk tip, trunk ring and trunk sleeve lines to the pair gain test controller 20, which includes a channel tester 22. To test the analog portion of the system, the trunk tip and trunk ring lines are coupled, at the PGTC 20, to a bypass pair 24, via a switch (not shown). When the MLT is connected to the bypass pair 24, the MLT is not coupled to additional circuitry. The bypass pair is coupled, at the RLU 16, to the POTS pair under test. That is, there is a direct analog connection between the MLT 18 and the subscriber's telephone being tested. Through such a connection, the MLT measures for shorts, opens, etc.

To test the digital portion of the network, the channel tester 22 in the PGTC 20 is coupled via the tip, ring and sleeve lines to a Numbered Test Trunk (No Test Trunk) 26. The No Test Trunk 26 and the central office switch 12 connect the tip and ring lines to a selected one of the POTS pairs, which in turn are multiplexed by the COLU 14 onto the HDSL pair. If the digital portion of the network is satisfactorily connected to the PGTC, the PGTC 20 places a 1 KΩ resistance value between the trunk tip and trunk ring lines which is interpreted by the DCTU as a signal that testing is to proceed. The HDSL pair is coupled to the RLU 16 which demultiplexes the test signals on the HDSL pair for the POTS line under test.

Test information about the digital portion of the network obtained by the PGTC 20 is provided to the MLT 18. That information, along with the analog line test result information obtained directly by the MLT is provided to a service technician for analysis of the test results, and, if needed, corrective action. See generally specification TR-TSY-00465 published by Bellcore.

FIG. 2 illustrates a system wherein the functions of the mechanized loop tester are integrated into the central office switch. This is referred to a I-MLT-2. In the integrated testing situation, a direct connect test unit (DCTU) 30 within the central office switch 12 controls the testing operations.

For an analog, i.e., non-DLC, network, the DCTU 30 is coupled through a modular metallic switch unit (MMSU) 32 to a line unit (LU) 34. The line unit 34 is coupled to the POTS line under test.

In a DLC network, the DCTU is coupled through the MMSU 32 to the trunk tip, trunk ring and trunk sleeve lines, which are in turn coupled to the pair gain test controller 20. To test the digital portion of the network, the channel tester 22, within the PGTC 20, is coupled via the tip and ring lines back through the MMSU 32, over to the line unit 34, and then to the POTS line under test. There is no connection for the sleeve line out of the PGTC 20. The POTS line is coupled to the COLU 14 which in turn is coupled to the RLU via the HDSL pair. If the digital portion of the network is satisfactorily connected to the PGTC, the PGTC 20 places a 1 KΩ resistance value between the trunk tip and trunk ring lines which is interpreted by the DCTU as a signal that testing is to proceed.

As with the non-integrated case, the network beyond the DLC is tested using the bypass pair 24. The trunk tip and trunk ring lines are coupled to the bypass pair 24 via switches (not shown) within the PGTC 20. During such test, the channel tester 22 is isolated from the trunk tip and trunk ring lines. Like the MLT in the non-integrated case, the DCTU 30 measures for shorts, opens, resistive faults and foreign voltages on the subscriber's line under test.

A major draw back of the FIGS. 1 and 2 systems is that for testing, a bypass pair 24 is required for every COLU/RLU pair. In other words for every HDSL pair, a bypass pair is required for testing purposes. This significantly lessens the extra line capability provided by the digital loop carrier system. Often, crafts personnel "borrow" the bypass pairs to correct other service problems and thus, they are not available when needed for testing.

A further disadvantage of the prior integrated testing technique is increased cost resulting from the need to provide an interface within the DLC to the PGTC.

SUMMARY OF THE INVENTION

Accordingly, it is an object of the present invention to provide a digital loop carrier system which does not require the use of a bypass pair for testing purposes.

It is an additional object of the invention to lessen DLC system costs by allowing a pair gain test controller to remain idle during testing, yet have a satisfactory system pass testing.

In accordance with the invention, a conditioner unit for a pair gain test controller is provided. The PGTC conditioner unit (PCU) is coupled to the PGTC via the sleeve line and the trunk ring line. The PCU senses a signal which indicates that the DCTU is seeking test results from the PGTC, and provides a signal which indicates to the DCTU that the PGTC test results are satisfactory, even though the PGTC remained idle.

BRIEF DESCRIPTION OF THE DRAWINGS

Aspects of the invention are described with reference to the drawings, in which.

DETAILED DESCRIPTION OF THE INVENTION

Figure 1:
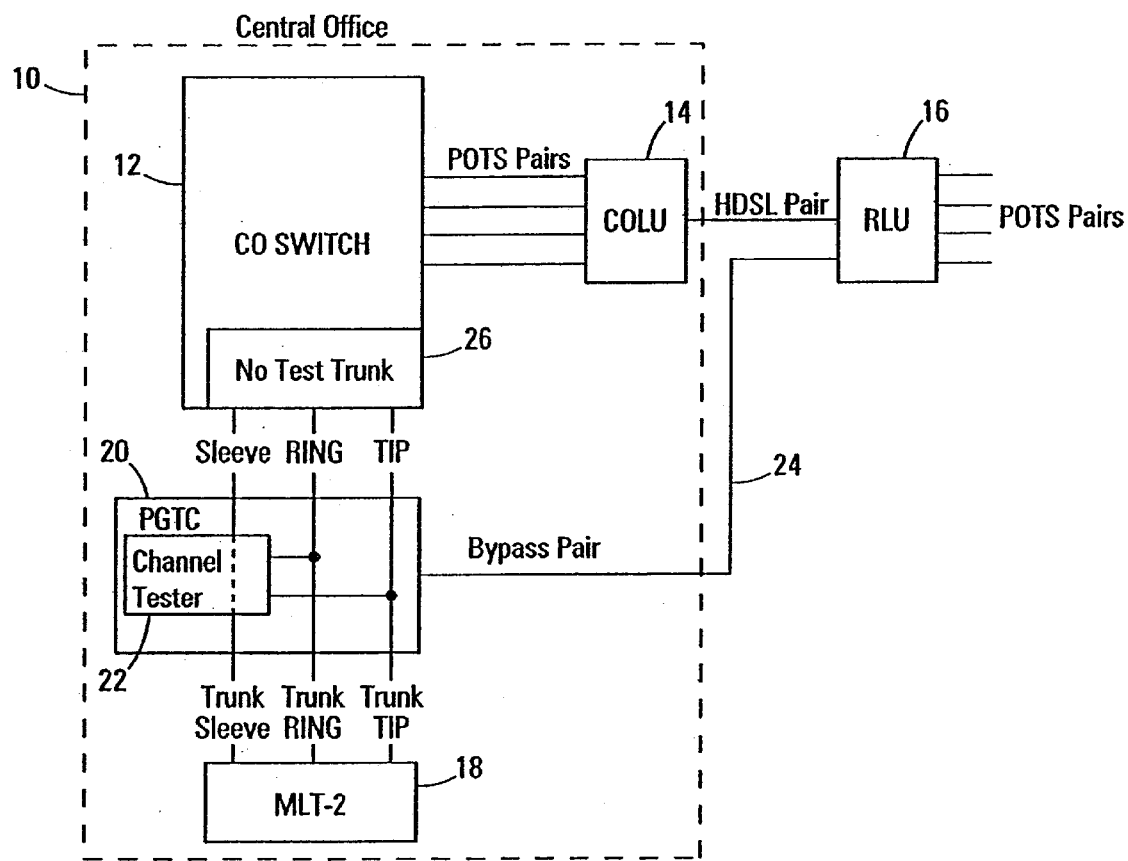
FIG. 1 is a block diagram of a digital loop carrier (DLC) which uses a pair gain test controller (PGTC) under control of a mechanized loop tester (MLT) to perform testing on the network.
Figure 2:
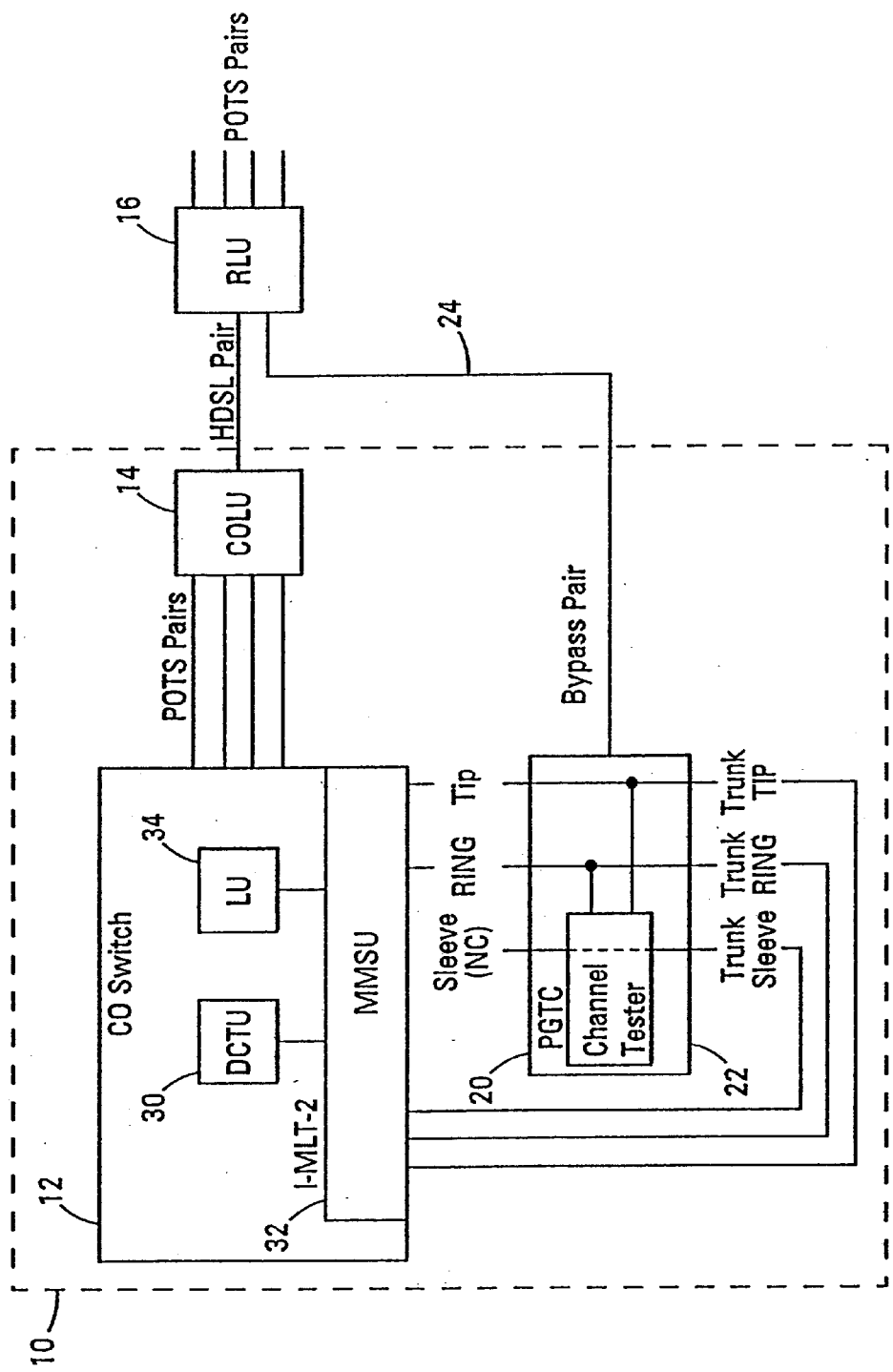
FIG. 2 is a block diagram of a DLC which uses a PGTC under control of an integrated mechanized loop tester (I-MLT) to perform testing on the network.
Figure 3:
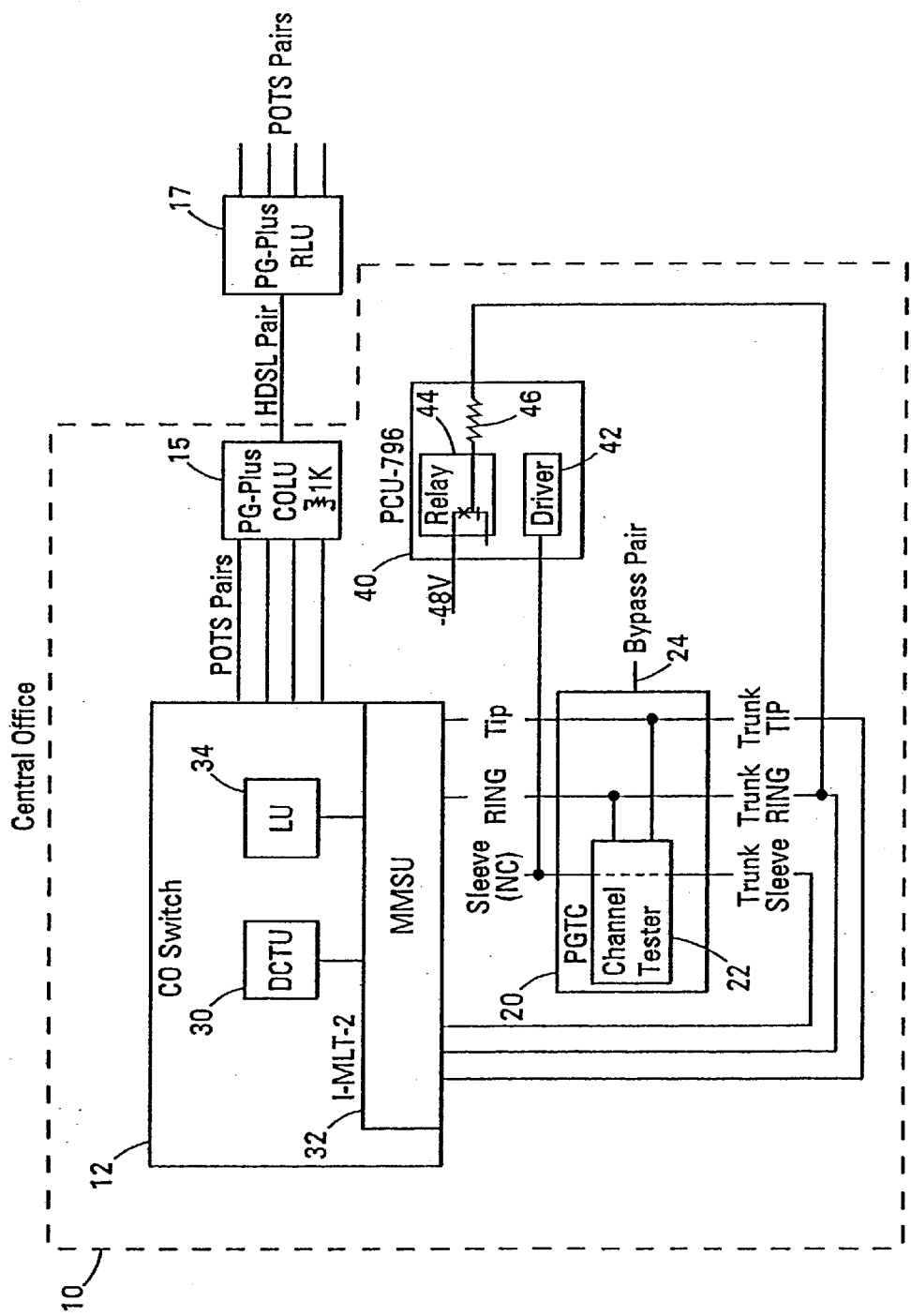
FIG. 3 is a block diagram of a DLC which includes a PGTC conditioner unit (PCU) in accordance with the present invention.

FIG. 3 is a block diagram of a digital loop carrier comprised of a PG-Plus central office line unit 15 and PG-Plus remote line unit 17. The PG-Plus COLU and RLU are manufactured and sold by ADC of Eden Prairie, Minn., USA.

The FIG. 3 DLC includes a PGTC conditioner unit (PCU) 40 according to the present invention. The input to the PCU is coupled to the sleeve line from the PGTC 20. Within the PCU, the input to the PCU is coupled to a driver 42, which controls the state of a relay 44. When the driver 42 senses no sleeve current, it causes the relay 44 to connect –48V, which is supplied to the PCU from a central office battery (not shown), through a resistor 46 to the trunk ring line, which is coupled to the DCTU 30 via the MMSU 32.

During I-MLT-2 testing of the PG Plus DLC, the DCTU 30 is coupled through the MMSU 32 to the trunk tip, trunk ring and trunk sleeve lines, which are coupled to the PGTC 20. The PGTC communicates with the PG-Plus COLU 15, via the tip and ring lines, the MMSU 32 and the LU 34. Normally, to test a subscriber's line, the central office test system will dial the subscriber's number in such a way as to cause the switch to connect the line to the tester. This connection is made through the PGTC. In the IMLT case, the line under test is connected through the LU, through to the MMSU, through the PGTC, back through the MMSU, and finally through to the DCTU.

If the DCTU then detects the presence of a DLC, the DCTU will cause the PGTC to commence a handshake sequence with the COLU. The DCTU starts this by applying 116V on the tip line with the ring line open. The PGTC and the DLC both see the 116V. Upon seeing the 116V, the PGTC waits for a 333 Hz tone and a handshake signal from the COLU. The COLU, seeing the 116V applies the 333 Hz tone back over the ring line and commences the handshake sequence. When the DLC and PGTC successfully finish the handshake sequence, the PGTC becomes satisfied that the DLC is properly configured to be tested. As an indication to the DCTU that the PGTC is satisfied, the PGTC places a 1 KΩ resistance value on the tip lead (that still has the 116V on it from the DCTU) to ground. The DCTU proceeds by changing the current state on the trunk sleeve lead from high to low current. Seeing the low current state, the PGTC activates its switches thereby separating the transport (HDSL) portion from the subscriber's line. The PGTC then commences testing on the DLC while MLT commences testing on the subscriber's line over the bypass pair.

Figure 4A:
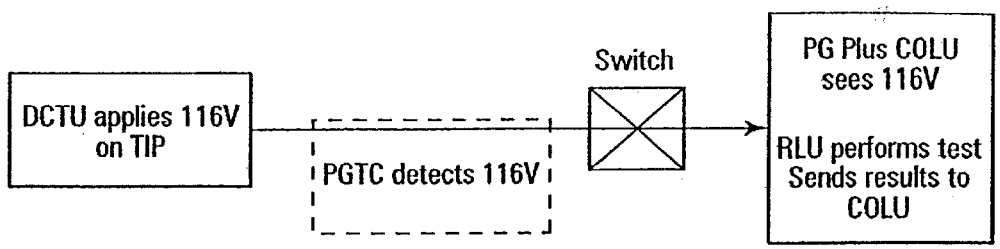
FIGS. 4(a)–4(c) are diagrams showing the signals passed between the DCTU and the DLC in accordance with the present invention.
Figure 4B:
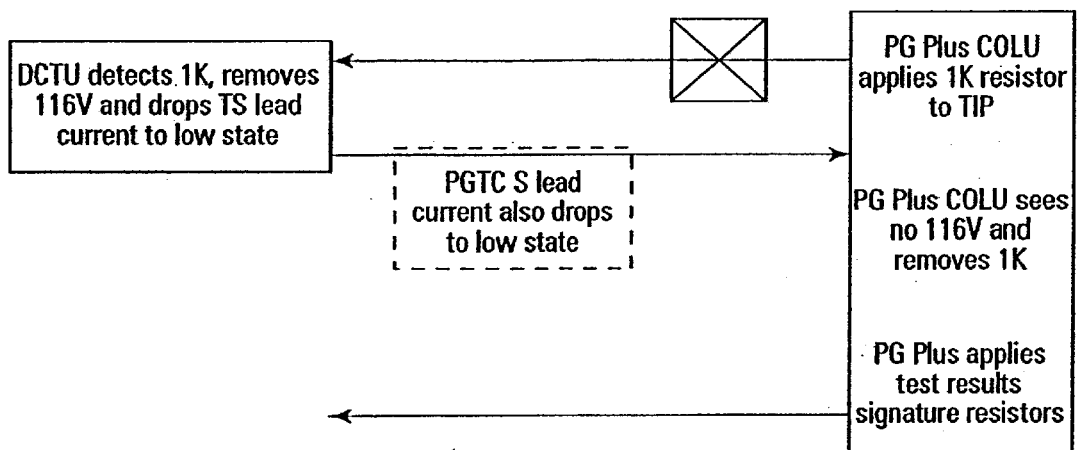

However, in the case of the PG Plus DLC, the PG-Plus COLU 15, seeing the 116V, does not apply the 333 Hz tone nor does it try to handshake with the PGTC. Instead, referring to FIG. 4(a), the PGTC is allowed to wait, while the PG-Plus system performs testing of its own on the subscriber's line. As shown in FIG. 4(b), when this testing is finished, the PG-Plus COLU applies a 1 KΩ resistance value on the tip line. This is interpreted by the DCTU as an indication that the PGTC is ready to proceed with testing, not withstanding that the PGTC was not actually activated. In response to the 1 KΩ resistance value on the tip line, the DCTU removes the 116V signal and sets the trunk sleeve line to a low current state. In response to the removal of the 116V signal on the tip line, the PG Plus COLU removes the 1 KΩ resistance value and applies test results signature resistors for sensing by the DCTU.

As noted above, the PG Plus DLC performs testing on the subscriber's line. The test results are sent by the PG-Plus RLU to the PG-Plus COLU 15. The PG-Plus COLU in turn provides the test results to the DCTU 30. Thus, information about the quality of the subscriber's line is provided to the DCTU without use of the bypass pair 24.

In accordance with the I-MLT-2 procedure, the DCTU, seeks to obtain test results about the DLC (i.e., the PG-Plus COLU and RLU) from the PGTC 20. To obtain such test results, the DCTU 30 sets the current on the trunk sleeve line to zero. Ordinarily (i.e., in a no test situation), the trunk sleeve current is approximately 17 mA (high current state). When the PGTC 20 is to be activated, the DCTU sets the trunk sleeve current to approximately 8 mA (low current state). Again, when the DCTU seeks to obtain test results about the DLC from the PGTC 20, the DCTU sets the trunk sleeve current to zero.

In response to the low current (8 mA) state on the trunk sleeve line, the PGTC 20 would ordinarily perform testing of the DLC by use of the channel tester 22 through the tip and ring lines, the MMSU 32, the LU 34, the POTS pair, the PG-Plus COLU 15 and the HDSL pair to the PG-Plus RLU 17 (see FIG. 3). In response to the no current (0 mA) state on the trunk sleeve line, the PGTC 20 would ordinarily return its test results to the DCTU on the trunk ring line. Successful testing of the DLC by the PGTC 20 would result in the PGTC 20 placing a –48V voltage signal on the trunk ring line. The –48V signal would be interpreted by the DCTU as a test OK signal.

However, the case of the PG-Plus DLC, the PGTC 20 is not activated. Accordingly, in response to the DCTU setting the trunk sleeve current to zero, the PGTC 20 will not apply the –48V signal to the trunk ring line. The lack of such response by the PGTC 20 would be interpreted by the DCTU 30 as a test fail condition.

Figure 4C:
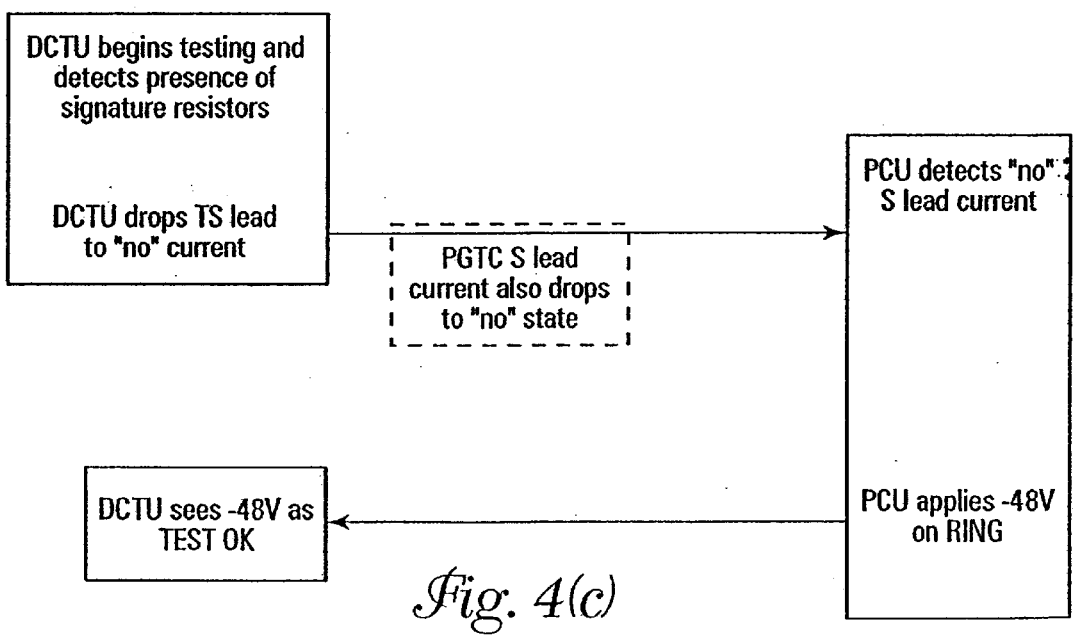

To overcome such problem, the PCU 40 is used. Referring to FIG. 4(c), the PCU senses the current on the sleeve line. When the current goes to zero, the PCU applies a –48V voltage signal to the trunk ring line. The –48V signal is interpreted by the DCTU 30 as a DLC test OK signal from the PGTC 20, even though the PGTC was not activated.

Figure 5:
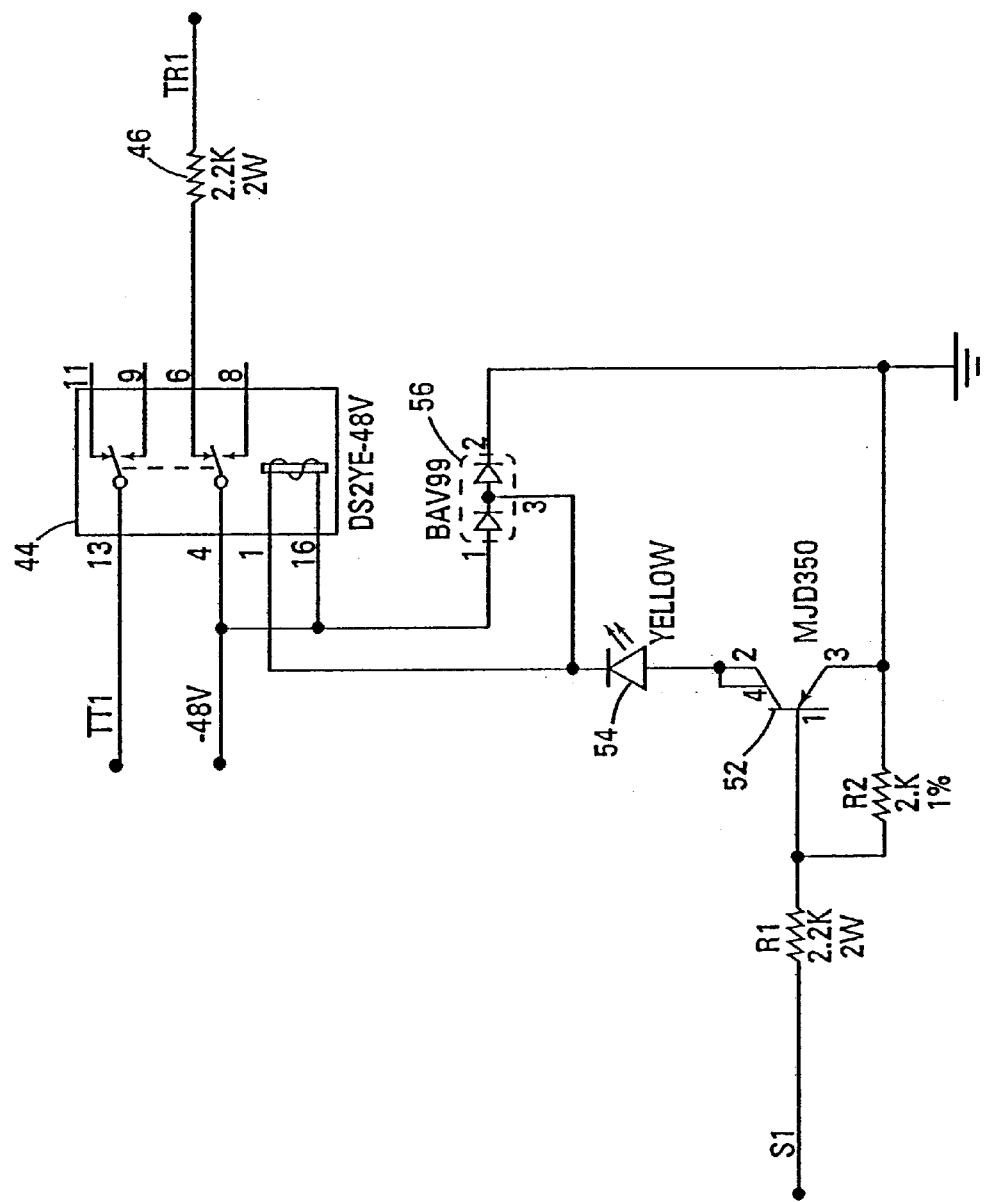
FIG. 5 is a schematic diagram of the PCU in accordance with the present invention.

FIG. 5 is a schematic diagram of the circuitry comprising the PGTC conditioner unit. The main components of the PCU are the relay 44 and a drive transistor 52. The base of the drive transistor 52 is coupled to the sleeve line S1, via a resistive divider comprised of resistors R1, R2. The emitter of transistor 52 is coupled to ground. The collector of drive transistor 52 is coupled, through indicator light emitting diode (LED) 54, to one of the coil inputs of the relay 44. The other coil input to relay 44 is coupled to the −48V central office power source. Diode pair 56 keeps the voltage at pin 16 of the relay within the range of a diode drop below −48V and a diode drop above ground. Relay 44 is shown as a double pole, double throw relay, DS2YE −48V. However, other types of relays, e.g., a single pole, single throw, or a switch, e.g., an analog switch, can be used. Also, a relay or switch could be driven directly by sleeve line S1 without use of a drive transistor 52. In FIG. 5, the trunk tip line TT1 is shown as being applied to pin 13 of relay 44. The trunk tip line is connected to the PCU simply because telephone connections are made with a pair of lines. The trunk tip line is not used by the PCU.

When current is present on the sleeve line S1, transistor 52 turns on so that the collector is pulled close to ground. Thus, approximately 48 volts is applied across the coil of relay 44. This causes the relay contact to be pulled down so that output pin 8 is connected to the −48V at input pin 4, and output pin 6 is open. Output pin 6 is coupled through resistor 46 to the trunk ring line TR1. Thus, when current is present on the sleeve lead (because, the PGTC is in the idle state or is actively testing, thus not being asked for test results), the trunk ring line is unaffected by the PCU.

On the other hand, when the DCTU sets the sleeve current to zero (to ask the PGTC for its test results) and the PGTC has not been activated, transistor 52 in the PCU will turn off. In such case, no voltage will be applied across the coil of relay 44, and relay output pin 6 will be connected to the −48V applied to relay input pin 4. Thus, the −48V central office battery voltage will be applied (through resistor 46) to the trunk ring line TR1. This will be interpreted by the DCTU as the PGTC's completion of a successful test of the DLC, even though the PGTC was not actually activated.

What is claimed:

1. A telephone system, comprising:
a central office switch coupled to a ring line and a tip line;
a pair gain test controller coupled to the ring line, the tip line and a sleeve line; and
a conditioner unit in parallel with the pair gain test controller for selectively applying a voltage signal to a trunk ring line in response to a current state of the sleeve line while the pair gain test controller is idle.

2. A telephone system, comprising:
a central office switch coupled to a ring line and a tip line;
a pair gain test controller coupled to the ring line, the tip line and a sleeve line; and
a conditioner unit in parallel with the pair gain test controller, wherein the conditioner unit applies a voltage signal to a trunk ring line when the sleeve line is in a no current state and wherein the conditioner unit removes the voltage signal from the trunk ring line when the sleeve line is in a low current state or a high current state.

3. A telephone system, comprising:
a central office switch coupled to a ring line and a tip line;
a pair gain test controller coupled to the ring line, the tip line and a sleeve line; and
a conditioner unit in parallel with the pair gain test controller, wherein the conditioner unit applies a voltage signal to a trunk ring line when a current level on the sleeve line is zero and wherein the conditioner unit removes the voltage signal from the trunk ring line when current is present on the sleeve line.

4. A telephone system, comprising:
a central office switch coupled to a ring line and a tip line;
a pair gain test controller coupled to the ring line, the tip line and a sleeve line; and
a conditioner unit in parallel with the pair gain test controller, wherein the conditioner unit applies a voltage signal to a trunk ring line when the sleeve line is in a no current state and wherein the conditioner unit presents an open circuit to the trunk ring line when the sleeve line is in a low current state or a high current state.

* * * * *